Oct. 8, 1968

L. C. WEATHERS 3,404,779

FILTER AND SLUDGE CONVEYOR

Original Filed Jan. 31, 1964

INVENTOR.
LELAND C. WEATHERS

BY

*Curtis, Morris & Safford*

ATTORNEYS

United States Patent Office 3,404,779
Patented Oct. 8, 1968

3,404,779
FILTER AND SLUDGE CONVEYOR
Leland C. Weathers, Livonia, Mich., assignor to Ajem Laboratories, Inc., Livonia, Mich.
Continuation of application Ser. No. 341,549, Jan. 31, 1964. This application July 26, 1966, Ser. No. 573,734
4 Claims. (Cl. 210—97)

ABSTRACT OF THE DISCLOSURE

A filter apparatus having a sheet of filter medium drawn from a supply and along a pervious concave support, substantially cylindrical with its axis parallel to the direction of movement. A suction chamber below said support sucks liquid from filter cake held on the medium as both are drawn along the support. Hold-down bars with edges contoured to fit the concavity of the support, whereby to engage the medium and move it along the support while lying substantially smoothly thereon, and off at the end.

---

The present invention relates to an apparatus for filtering dirty fluids. More particularly, the invention relates to an apparatus for filtering high volumes of fluid, which apparatus is easily maintained and operated.

This application is a continuation of application Ser. No. 341,549 filed Jan. 31, 1964, now abandoned.

There is a need for filtration equipment that can be operated continuously or nearly continuously. For example, in many industrial processing situations, it is undesirable to discard, after a single use, liquids used in the process. This is sometimes because of direct economic considerations, for example when the liquid is a relatively expensive oil or cutting coolant contaminated by chips or dirt, etc., and sometimes because of more indirect considerations, for example the desire to avoid a capital expenditure for more water supply lines or the necessity of conserving water induced by restricted local supply, or the necessity of avoiding pollution by discharging wastes.

In such filtration operations, it is important to have a filter that may be operated as long as possible without excessive down-time for cleaning, advancing new filter medium, etc. Unless such down-time can be avoided, it may be necessary, during the filter-shutdown periods, to shut down also the processing operation to which the filtered liquid is being recycled, or to provide an auxiliary filtration unit, or to provide a storage unit maintaining a reservoir of pre-filtered liquid. These methods of mitigating the effects of non-continuous filtration require increased capital investment for greater plant floor space and for the addition of equipment involved. Furthermore, frequent shutting down and starting up of suction pumps cause excessive wear on the pumps. Thus, it is important for trouble-free filtration to have equipment capable of smooth operation and capable of continuously supplying filtered fluid for various processes.

It is an object of the present invention to provide filtration equipment that may be operated with minimized maintenance and operator attention. It is another object of this invention to provide filtration equipment adapted for use of inexpensive filter media and capable, when desired, of heavy-duty filtration operations. Another object of this invention is to provide a compact filtration unit capable of handling relatively high rates of flow but using relatively small floor space. A further object is to provide filtration apparatus capable of removing relatively large quantities of sediment or filtered dirt.

The apparatus of the present invention provides filtration through a suction box by suction means, such as a pump and a multi-position valve in its outlet line. When a pressure drop caused by obstruction to flow of liquid through a ditry filter section reaches an undesirably high level, the suction may be relieved by connecting the pump outlet to the inlet of the suction means. This short circuiting the flow will cause loss of significant pressure differential through the filter medium and thus facilitate advance of the filter medium across the suction box without shutting off the suction means. In the absence of substantial suction, and in some cases in the presence of positive pressure tending to lift the filter medium, the filter medium may be advanced without the aid of an underlying conveyor belt, and the tensile strength of the filter medium is not exceeded by frictional drag on the suction box.

Ordinarily, a small reservoir of clean liquid has been provided from which a process may be supplied while the suction is short circuited.

It is also permissible within the scope of the invention to provide an under-support for the filter media, e.g. a belt or multiple roller supporting means.

Advantageous means for maintaining the filter media in place when no vacuum is imposed are cleats bearing on the media. Such cleats, for example if mounted on a continuous belt, are also advantageous in aiding the advance of the filter media. However, the cleats should be of such cross-sectional area as to avoid interfering with any significant area of filter surface, and should be designed and mounted so that the carrier belt does not seriously interfere with the flow of liquid through the filter media. Such cleats serve a further function of keeping the filter media spread about laterally over the full width of the suction box.

In order to increase the soil-and-dirt-carrying capacity of the filter media, it is advantageous to utilize a suction box of novel elongated concave structure. Another advantage of such a concave suction box is that the filter bed is more snugly held in position.

It is to be understood that the equipment herein described may be operated manually or automatically. The preferred mode of operation is to have a multi-position valve operated automatically. Electrical, mechanical and hydraulic control are possible as recognized by those skilled in the art. However, pneumatic control is most advantageous as it avoids contacts which may easily become dirty and also avoids electrical connections at the suction box. This control is achieved by a pressure switch which is actuated when suction box pressure rises significantly causing the short-circuiting of the suction line as heretofore described. A time delay switch or a programming device may be used to control the shift of the diverting valve for the release of the suction box vacuum and the indexing of the filter media at suitable intervals.

This method of advancing filter media avoids the problems associated with prior art devices, for example those of the type which require a scraping of the deposit before the vacuum is significantly reduced to allow a free movement of filter media. Such scraping can damage the filter medium, can remove a valuable filter aid when it disturbs the sediment, and can cause sufficient disturbance to redisperse a considerable quantity of deposited sediment. None of these deleterious effects take place with the apparatus of the instant invention. Furthermore, the lack of scraping stress applied to filter media on the instant invention allows the use of weaker and less expensive filter medium.

A particular advantageous embodiment of the present invention incorporates a clean-liquid reservoir and utilizes a contoured lead-in on which the filter medium is gradually shaped as it is fed onto the suction box. This gradual shaping and meeting of the filter medium and the suction box prevents wrinkling and resultant inefficient filtration.

In this application and accompanying drawings, I have shown and described a preferred embodiment of my invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the conditions of a particular case.

Figure 1:
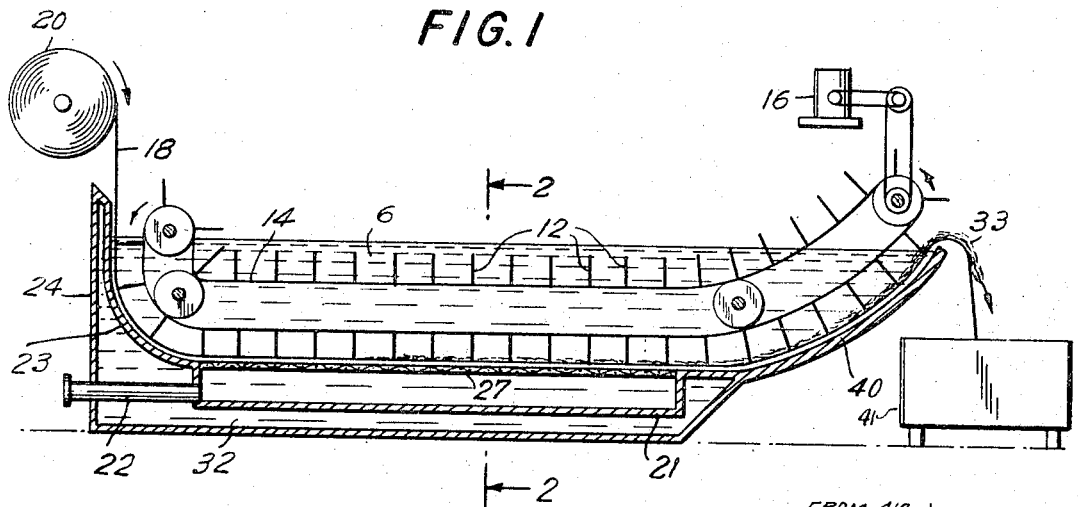
FIGURE 1 is a diagrammatic view in longitudinal section of a filter apparatus of the present invention.
Figure 3:
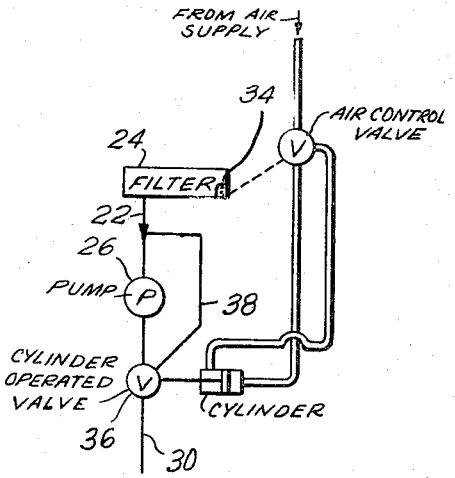
FIGURE 3 is a flow diagram of the divert valve system.
Figure 4:
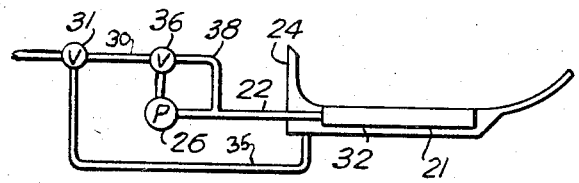
FIGURE 4 is a diagrammatic plan view of the filtrate flow pattern of an apparatus embodying the present invention and includes also an elevational representation of the tank structure to show the relationship of the flow pattern thereto.

Tank 24 holds a mass of dirty liquid 6 for filtration. Referring to FIGURE 1, it is seen that convex hold-down bars 12 are mounted on continuous belt 14 which comprises sprocket chains 13 (see FIGURE 2) and are driven by drive mechanism 16. Filter media 18 unwinds from roll 20 and is carried from time to time as required by hold-down bars 12 across concave-surfaced suction box 21. Cleaned liquid is sucked through the concave and pervious face of the filter box out pipe 22 by pump 26 (see FIGURES 3 and 4).

Figure 2:
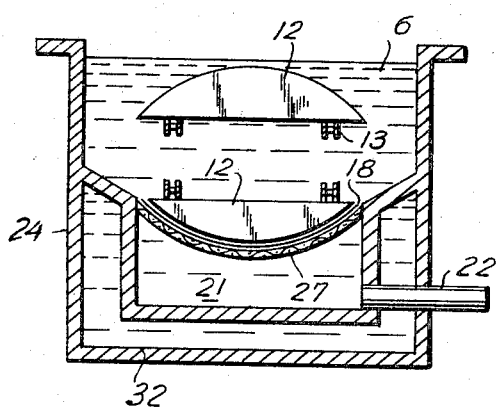
FIGURE 2 is a cross-sectional view of the apparatus taken on line 2—2 of FIGURE 1.

Because of the concave shape of the suction box 21, as shown in FIGURE 2, an end portion 23 on tank 24 is gradually contoured to the concave form, thus materially reducing the problem of wrinkled filter medium on the suction box.

In operation, suction pump 26 sucks filtrate into suction box 21 through its pervious face 27 and filter medium 18, and out through line 22, three-way valve 36, and line 30 to a three-way valve 31, which, depending on its position, causes the filtrate to go to clean liquid tank 32 for storage or directly to a process being supplied with clean filtrate. A pump and pipeline (not shown) provide means for moving stored cleaned filtrate from tank 32 to process when needed.

When sediment 33 (see FIGURE 1) causes a predetermined pressure drop across media 18, pressure sensitive switch 34 (see FIGURE 3) causes three-way valve 36 to connect pump 26 with line 38 and thus disconnect pump 26 from line 30. Flow is then diverted back through line 38, the resulting short-circuiting of the pump relieving suction in suction box 21. The pneumatic power circuit for operating switch 34, for controlling valve 36, is shown diagramically in FIGURE 3. This may also be a hydraulic, electric or even mechanical circuit as is well understood in the art. Drive mechanism 16 is also controlled by switch 34, advantageously through a delay relay so that movement of the medium starts after switch 34 is released. The filter media is then advanced. The drive 16 is cut off and the suction pump 26 is again operated, e.g. by a tripper for switch 34 actuated by a predetermined movement of the conveyor 14 or by a time delay which allows such movement.

Hold-down bars 12 maintain the filter media in position against any position pressure from pump 26 and provide means for moving the media horizontally across the suction box. They also provide a sludge conveying means tending to dispose of sludge settling in bottom area 40 of tank 24 as well as pushing of used filter medium along to the discharge edge where it drops into waste hopper 41 in disposal area.

When clean media has been moved into position, the divert valve is repositioned manually or automatically, as above stated, to direct the flow of filtrate through lines 35 and 30 into tank 32 from which process liquid is drawn (or directly to the process equipment).

What is claimed is:

1. A filtration apparatus having a tank for holding a mass of liquid to be filtered, a liquid discharge line therefor, a suction box assembly within said tank having a previous filter face, a strip of filter medium arranged for passage over said previous filter face, suction means having an inlet and an outlet, said outlet being connected to said liquid discharge line, a liquid feedback line having valve means to connect one end of said feedback line to said outlet of said suction means and having a second end connected to said inlet of said suction means, said valve means having means for controlling flow from said outlet into said discharge line for one position of said valve means and for diverting such liquid through said feedback line to the inlet side of said suction means for another position of said valve means thus to relieve suction in said suction box, said apparatus further comprising a conveyor belt mounted over said suction box and cleats thereon providing means for holding said filter medium.

2. A filtration apparatus as in claim 1 wherein the pervious face of said suction box is an elongated concave structure.

3. Filtration apparatus comprising a tank for holding a mass of liquid to be filtered a suction box assembly within said tank, a pervious filter face on said suction bax, a strip of filter medium arranged for passage over said pervious face, a continuous belt assembly positioned to pass over the outside of said suction box beside said pervious face, said belt assembly having cleats mounted thereon for bearing against said filter medium, suction means having an inlet and an outlet, a clean liquid discharge line connected to said outlet, a feedback connection between said inlet and said outlet, and a valve controlling flow through said feedback connection, said valve in one position directing liquid from said outlet into said discharge line and in another position directing liquid from said outlet through said feedback connection back to said inlet of said suction means, thus relieving suction in said suction box.

4. A filtration apparatus having a tank for holding a mass of liquid to be filtered, a liquid discharge line therefor, a suction box assembly within said tank having a pervious filter face, a strip of filter medium arranged for passage over said pervious filter face, suction means having an inlet and an outlet, said outlet being connected to said liquid discharge line, a liquid feedback line having valve means to connect one end of said feedback line to said outlet of said suction means and having a second end connected to said inlet of said suction means, said valve means for controlling flow from said outlet into said discharge line for one position of said valve means and for diverting such liquid through said feedback line to the inlet side of said suction means for another position of said valve means thus to relieve suction in said suction box.

References Cited

UNITED STATES PATENTS

| 2,094,350 | 9/1937 | Cartigny | 210—401 |
| 3,091,336 | 5/1963 | Hirs | 210—111 |

FOREIGN PATENTS 1,33,116 6/1963 France.

REUBEN FRIEDMAN, *Primary Examiner.*

J. ADEE, *Assistant Examiner.*

UNITED STATES PATENT OFFICE
CERTIFICATE OF CORRECTION

Patent No. 3,404,779  October 8, 1968

Leland C. Weathers

It is certified that error appears in the above identified patent and that said Letters Patent are hereby corrected as shown below:

Column 4, lines 10 and 11, "previous", each occurrence, should read -- pervious --; line 32, "bax" should read -- box --.

Signed and sealed this 10th day of March 1970.

(SEAL)
Attest:

Edward M. Fletcher, Jr.

Attesting Officer

WILLIAM E. SCHUYLER, JR.

Commissioner of Patents